(12) United States Patent
Holzer et al.

(10) Patent No.: US 8,848,361 B2
(45) Date of Patent: Sep. 30, 2014

(54) ADJUSTABLE DOCKING APPARATUS

(75) Inventors: Eric Holzer, Piscataway, NJ (US); Mary Beth Poandl, Red Bank, NJ (US); Thomas Choi, Edison, NJ (US); Andrew Skurdal, Jersey City, NJ (US)

(73) Assignee: SDI Technologies, Rahway, NJ (US)

( * ) Notice: Subject to any disclaimer, the term of this patent is extended or adjusted under 35 U.S.C. 154(b) by 129 days.

(21) Appl. No.: 13/601,285

(22) Filed: Aug. 31, 2012

(65) Prior Publication Data
US 2013/0058036 A1 Mar. 7, 2013

Related U.S. Application Data

(60) Provisional application No. 61/530,607, filed on Sep. 2, 2011.

(51) Int. Cl.
*H05K 7/00* (2006.01)

(52) U.S. Cl.
USPC ............ 361/679.44; 361/679.3; 361/679.23; 361/679.41; 361/679.39; 361/679.55

(58) Field of Classification Search
CPC ..... G06F 1/1632; G06F 1/203; G06F 1/1624; A61B 8/4433; B60R 2011/008
USPC ............ 361/679.3, 679.23, 679.41, 679.44, 361/679.39, 679.55
See application file for complete search history.

(56) References Cited

U.S. PATENT DOCUMENTS

| | | | | |
|---|---|---|---|---|
| 7,738,247 | B2* | 6/2010 | Choi | 361/679.43 |
| 2007/0263348 | A1* | 11/2007 | Rutledge et al. | 361/681 |
| 2009/0073642 | A1 | 3/2009 | Jubelirer et al. | |

FOREIGN PATENT DOCUMENTS

WO    WO-2011/094703 A1    8/2011

OTHER PUBLICATIONS

International Search Report issued Mar. 20, 2013 in PCT Application No. PCT/US2012/053406.
International Preliminary Report on Patentability mailed Mar. 13, 2013 in PCT Application No. PCT/US2012/053406.

* cited by examiner

*Primary Examiner* — Robert J Hoffberg
*Assistant Examiner* — Hung Dang
(74) *Attorney, Agent, or Firm* — Christopher J. McKenna; Moses A. Heyward; Foley & Lardner LLP

(57) ABSTRACT

The present solution provides an adjustable docking apparatus configurable to accommodate a variety of mobile electronic devices. The adjustable docking apparatus is removably coupled to a base electronic device. The apparatus further includes an electrical connector movably and removably connected to the adjustable docking apparatus and electrically coupleable to the base electronic device.

18 Claims, 18 Drawing Sheets

ADJUSTABLE DOCKING APPARATUS

CROSS REFERENCE TO RELATED APPLICATIONS

The present application claims priority to U.S. Provisional Application No. 61/530,607 filed Sep. 2, 2011, entitled "Adjustable Docking Apparatus," which application is incorporated herein by reference in its entirety.

FIELD OF THE INVENTION

The present application generally relates to adjustable docking apparatuses for electronic devices. In particular, the present application relates to docking apparatuses having adjustable components, which adjustability allows the apparatuses to accommodate a variety of electronic devices having spatially different electrical connector configurations.

BACKGROUND

Some electronic systems are designed for structural coupling with other independent portable devices. For example, electronic speaker systems are available that include docking units configured to engage with a particular mobile electronic device, such as cellular telephone or smart phone. In such systems, docking the electronic device with the docking unit of the system generally electrically connects the mobile device and the base system electrically and creates an interface that allows data files such as audio or video files stored on the mobile device to be transmitted to and through the base system. However the prolific generation of mobile device makes production of a docking system that is structurally configured to physically support a device having a particular geometry and data port location more challenging. Accordingly, a large subset of devices may not be compatible with an underlying base system due to the differing geometries, dimensions, or port locations of the device, which limits sales and or increases manufacturing costs and hence increases production costs.

SUMMARY

Inventive embodiments provide an apparatus for adjustably docking a mobile electronic device on a base electronic device. In various embodiments the apparatus includes a docking platform for receiving a mobile electronic device and an electrical connector electrically coupled to the base electronic device. The docking platform is positioned in an upper region of the base electronic device and the docking platform includes an opening in a surface of the platform. The docking platform is removably coupled to the base electronic device. The electrical connector is removably and slidably coupled to the docking platform. At least a portion of the electrical connector extends through the opening in the surface of the docking platform. The electrical connector is electrically connectable to the mobile electronic device.

In various embodiments, the electrical connector extends through the opening in the docking platform such that a base of the connector and a peripheral side of a mobile electronic device connected to the electrical connector interface in a plane of the docking platform, whereby the connected mobile electronic device is flush with the docking platform.

The docking platform may include a recess disposed therein and the opening may be positioned in the recess.

In various embodiments, the electrical connector includes a channel and the docking platform includes a track configured for engagement with the channel whereby the electrical connector is removably and slidably coupled to the docking platform.

The electrical connector may include a second electrical connector coupled to the first electrical connector via a flexible cable, in accordance with various embodiments. In related embodiments, the base electronic device may include a connector port configured for removably coupling the second electrical connector to the base electronic device.

In various embodiments, the apparatus also includes a posterior support bracket coupled to the docking platform to provide support to the mobile electronic device when received on the docking platform. The posterior support bracket may extend from the docking platform in a direction having a vertical component.

In various embodiments the electrical connector is electrically connected to the base electronic device by a flexible electrical cable. The flexible cable may be removably connected to the base electronic device.

The electrical connector may be angled with respect to the docking platform. The angle of the electrical connector may correspond with the angle of a surface of the posterior support bracket, such that the electrical connector and the angle surface of the posterior support bracket are substantially parallel. The electrical connector may include at least one of microUSB, a Type A or Type B USB, an iPod™, iPhone™, or iPad™ connector, a PDMI connector, and a HDMI connector. The electrical connector may include a socket and a plug, the socket disposed at the base of the connector and configured for coupling with a distinct flexible cable or cord. The electrical connector may be configured to transmit power, data or any combination of power and data. Some embodiments may include one or more adjustable electrical connectors on the adjustable docking apparatus. The electrical connector may be movable laterally with respect to the support structure and base, such that the devices remains centered on the base of the docking apparatus.

In various embodiments, the base electronic device may include an alarm clock radio, an audio transmission system, a video transmission system, or an audio-video transmission system. The base electronic device may include a telephone, a keyboard, or an electronic display.

Various inventive embodiments provide a system for docking a mobile electronic device. The system includes a base electronic device having at least one of an audio output component or a video output component for providing output from a mobile electronic device docket on the based electronic device. The system further includes a docking platform for receiving the mobile electronic device. The docking platform may be removably coupled to the base electronic device and may be positioned in an upper region of the base electronic device. The docking platform includes an opening disposed therein. The system also includes an electrical connector electrically coupled to the base electronic device. The electrical connector is removably and slidably coupled to the docking platform. At least a portion of the electrical connector extends through the opening in the docking platform and is electrically connectable to the mobile electronic device.

In various embodiments, the system also includes a posterior support bracket coupled to the base electronic device to provide support to the mobile electronic device when received on the docking platform. The posterior support bracket extends from the base electronic device in a direction having a vertical component.

In various embodiments, the electrical connector includes a channel and the docking platform includes a track configured for engagement with the channel whereby the electrical connector is removably and slidably and coupled to the docking platform.

The electrical connector may include a second electrical connector electrically coupled to the first electrical connector via a flexible cable in accordance with various embodiments. The base electronic device may include a connector port configured for removably coupling the second electrical connector to the base electronic device. The second electrical connector may include a USB connector. The electrical connector may be configured for at least 180 degrees of rotation in the docking platform in accordance with various inventive embodiments.

BRIEF DESCRIPTION OF THE DRAWINGS

The foregoing and other objects, aspects, features, and advantages of inventive embodiments will become more apparent and better understood by referring to the following description taken in conjunction with the accompanying drawings, in which.

The features and advantages of the present inventive embodiments will become more apparent from the detailed description set forth below when taken in conjunction with the drawings.

DETAILED DESCRIPTION

Inventive embodiments disclosed herein relate to an adjustable docking apparatus configurable to accommodate a variety of mobile electronic devices, such as cellular phones, having distinct geometries and distinct electrical port locations. For example some cellular phones may have an input/output (I/O) port located on the bottom of the phone while others may have a similar port located on the side. Additionally, devices having similar ports on the side of the device may still differ from one another in that one device may have a centered side port while other devices may include an off centered side port (i.e. a side port that may be closer to an extremity, top or bottom, of the side). Various inventive embodiments permit such devices to properly dock to a base electrical system despite any inconsistency in port locations on distinct mobile devices. Particularly, inventive embodiments allow a variety of devices to be docked on a base electrical system, such that the device is centrally positioned on the base system and thereby properly engages with the support components of the system.

Figure 1:
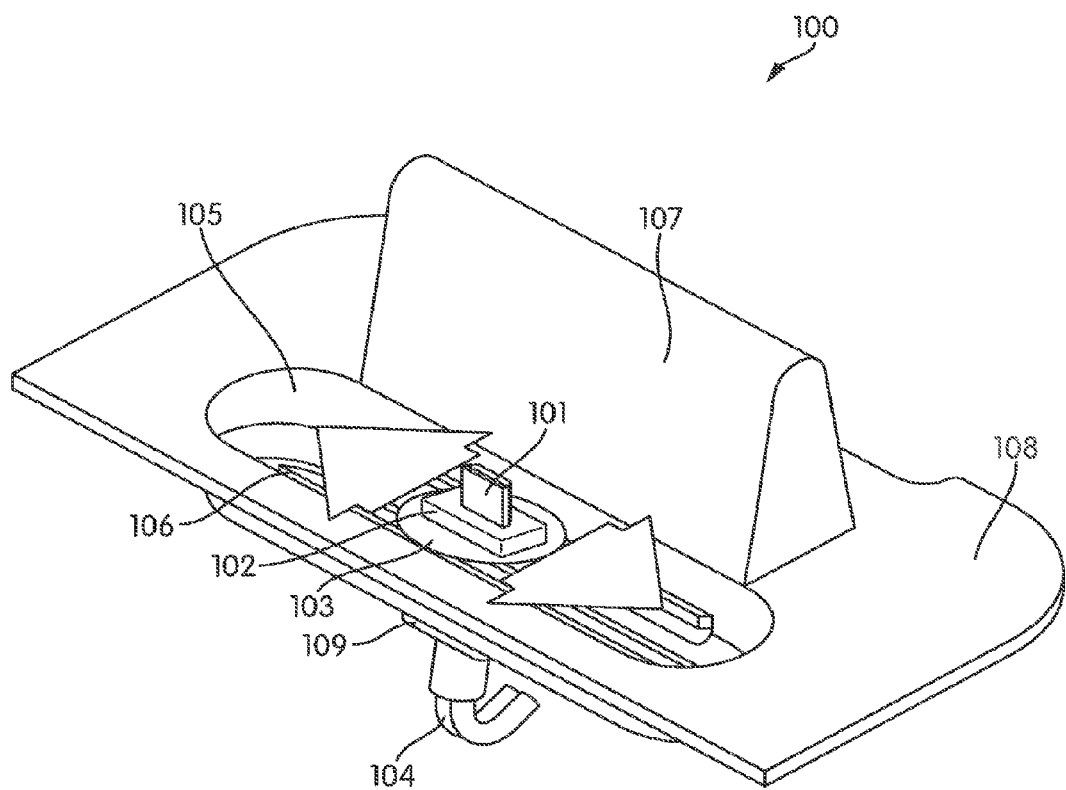
FIG. 1 is a perspective view of an adjustable docking apparatus in accordance with various inventive embodiments.

FIG. 1 is a perspective view of an adjustable docking apparatus in accordance with various inventive embodiments. Adjustable docking platform unit 100 includes an electrical connector 101, such as a micro USB electrical connector. Electrical connector 101 may be another type of electrical connector in accordance with various inventive embodiments including, but not limited to, the Apple 30-pin dock connector (the connector used with most iPods, the iPhone and the iPad), a PDMI (portable digital media interface) connector, a Type A or B USB connector, or another USB connectors, or other connectors which may be associated with cellular telephones, smart phones, PDAs (personal digital assistants) or other portable electronic devices and digital medium storage devices. Connector 101 may be configured to function purely as a power cord for charging or power a mobile device connected thereto in accordance with some embodiments, while connector 101 may additionally be configured to transfer data in accordance with other embodiments. Connector 101 includes a connector platform 102, which assists in supporting the device connected to electrical connector 101. The platform further interfaces with bearing 103. Bearing 103 may include one or more slots or channels configured to receive a track upon which the bearing may slide. In some embodiments, connector 101, platform 102, and bearing 103 may be a single integral unit. In some embodiments, connector 101, platform 102, and bearing 103 may be distinct components, which may composed of distinct materials, coupled together. Connector 101 may also include an electrical extension 109, in the form of a printed circuit board or another electrical interface that extends through bearing 103 to interface with an electrical connector or electrical system located with a base device on which docking unit 100 may be positioned and with which docking unit 100 may be engaged and electrically coupled. A flexible cable 104 may be connected directly to electrical connector 101. Alternatively, the flexible cable may be connected to an electrical interface extending from connector 101 and through bearing 103 as discussed above. The ability to connect and disconnect flexible cable 104 to electrical connector 101 may increase the modularity of the device. Flexible cable 104 allows connector 101 to remain electrically connected to a base system when the electrical connector is moved within channel 106.

Adjustable docking unit 100 may include a recessed region or cradle 105. Recessed region 105 may be geometrically shaped to fit a particular device or it may fall within a particular dimensional range such that a variety of devices are permitted to rest within the recessed region. Region 105 provides a space within which connector 101 and the associated components, namely connector platform 102 and bearing 103 travel to adjust the location of connector 101. The recess allows components associated with connector 101 to remain below platform 108, thereby providing an unobstructed region within which a device connected to connector 101 may occupy. Bearing 103 may be composed of a various low friction material, such as Polyoxymethylene (Delrin™), to facilitate smooth and steady movements of connector 101 through a range of positions within recess 105. A portion of bearing 103 may extend through a channel 106 within the recess. The channel defines and limits the range of motion of connector 101. Channel 106 extends laterally across the adjustable docking unit. Because channel 106 extends laterally across the docking unit, the connector is able to move laterally across the docking unit and thereby is able to maintain a fixed distance with respect to support bracket 107, which may also be adjustable in a direction transverse to the lateral direction of travel of connector 101, in accordance with various embodiments, to accommodate devices having distinct thicknesses. As will be discussed further herein, the lateral adjustability of the connector 101 permits the docking unit to maintain any one of variety of device connected thereto in a central location on the unit and hence in a central location on a base electrical device to which the unit is coupled, despite the fact that different devices may have different port locations. The lateral adjustability may be facilitated by direct manipulation of connector 101 or via manipulation of a positioner coupled to the connector via one or more linkages, as further disclosed herein. This configurability provides multiple benefits. Specifically, this configurability allows a device connected to the adjustable unit via connector 101 to remain evenly supported via supplemental support structures such as bracket 107, which support may reduce torsional forces on connector 101, which might be experienced by an otherwise unbalanced or unevenly supported device. Additionally, it allows a user to enjoy the viewing pleasure of a properly positioned (centered) device, without the need for a different unit or special adapter configured specifically for the device the user is using.

Figure 2:
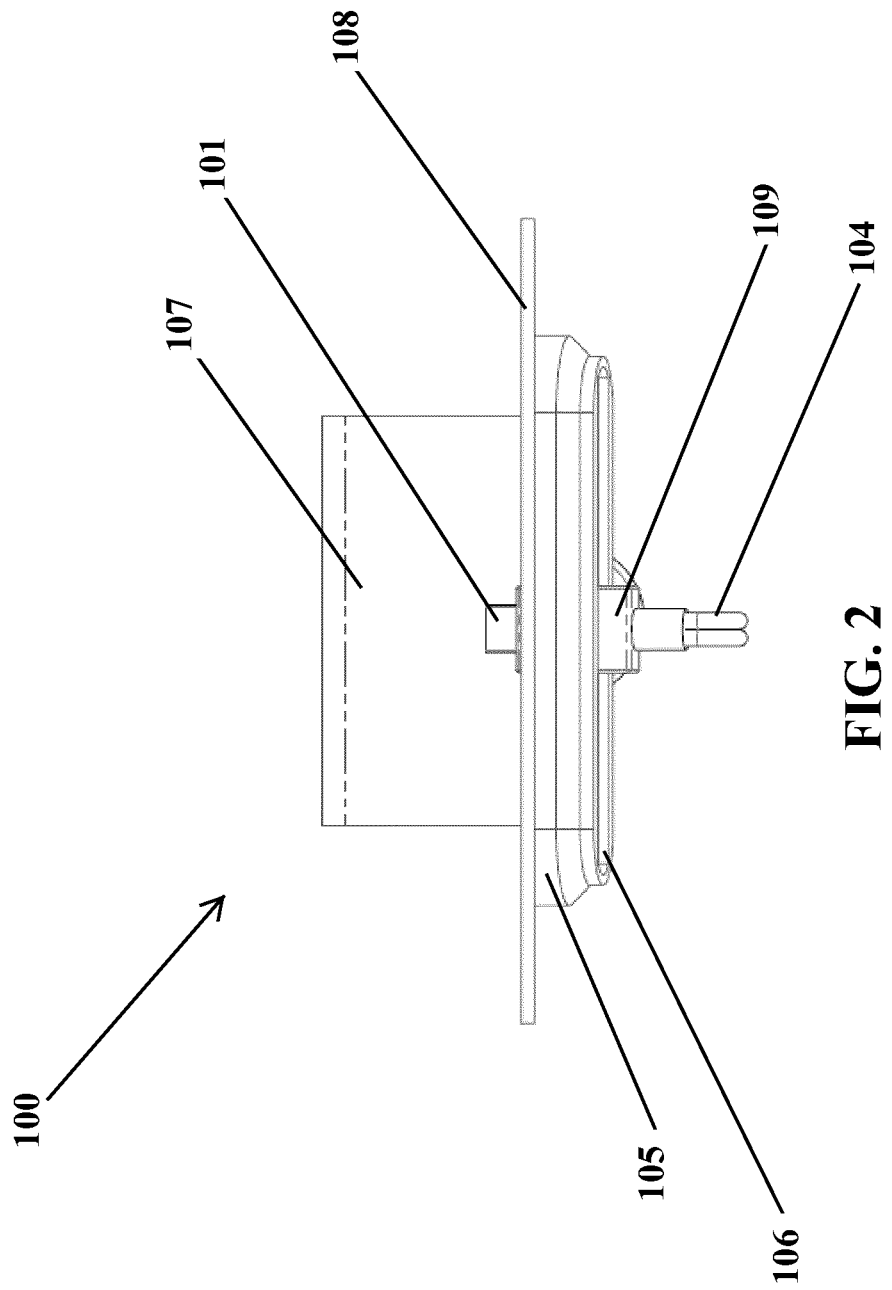
FIG. 2 is front view of the adjustable docking apparatus of FIG. 1.

FIG. 2 is front view of the adjustable docking apparatus of FIG. 1. As demonstrated in FIG. 2, the recessed region 104 allows the components connected to electrical connector 101 to remain essentially below the surface of the docking platform 108, thereby allowing a connected device to remain flush with the platform surface. Electrical connector 101 has a lateral degree of freedom as the interface 109 extends through lateral channel 106 positioned in recess 105. In view of the direction of extension of lateral channel 106 within recess 105, connector 101 is movable in a lateral direction, thereby facilitating the maintenance of a device connected to connector 101 at a central location with respect to platform 108 and bracket 107, despite the variation in location on various devices of the input/output port, to which connector 101 connects. Flexible cable 104 may be provided with the requisite flexibility and length so that connector 101 travels to the extremities of channel 106.

Figure 3:
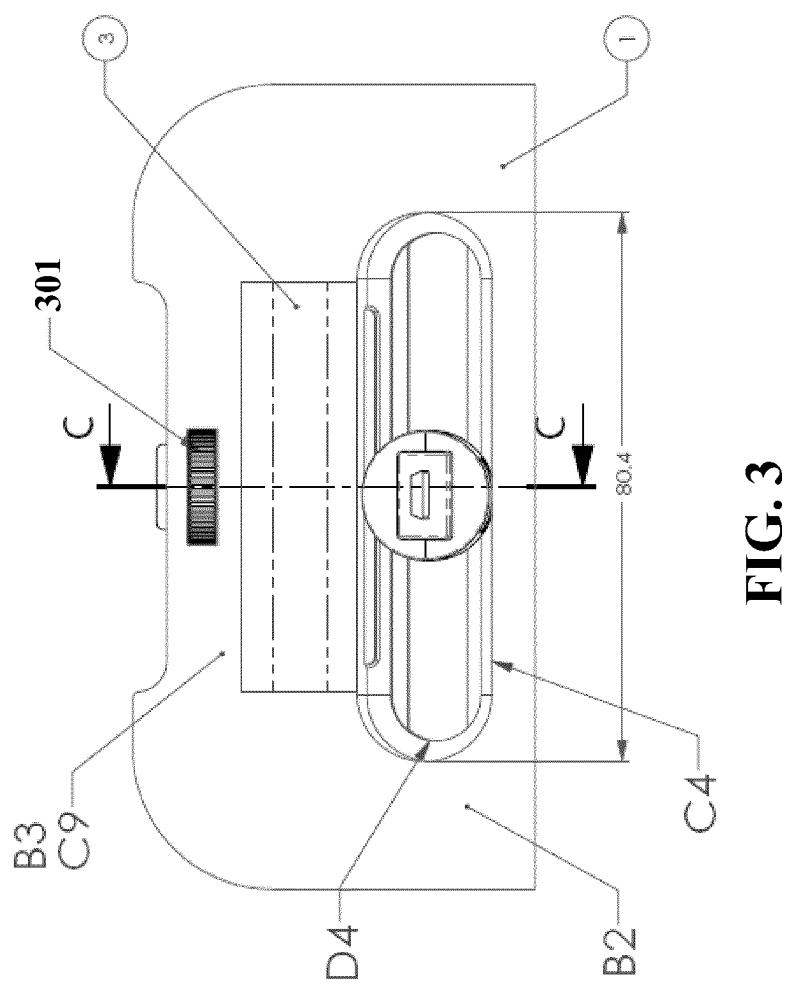
FIG. 3 is top view of the adjustable docking apparatus of FIG. 1.

FIG. 3 provides a top view of the adjustable docking apparatus of FIG. 1. The docking apparatus includes a positioner, which, as shown in FIG. 3, may include an actuation mechanism such as rotary knob 301. The positioner may be used to adjust the distance between the electrical connector 101 and bracket 107, by moving at least one of the connector and bracket with respect to one another in a direction substantially orthogonal to the lateral movement of connector 101. The positioner may alternatively or additionally facilitate the lateral translation of electrical connector 101. Other actuation mechanisms (mechanical or electromechanical) may be implemented in accordance with various embodiments. For example, a rotating lever or a slide may be implemented as a part of the positioner. Additionally, the positioner or a component of the positioner may extend through a surface in a base device, for example a side wall of the base device, as an alternative to extending through an upper surface in platform 108 as knob 301 does in FIG. 3. Knob 301 may include a plurality of ridges to increase the traction a user may have on the knob. Knob 301 may be coupled to the electrical connector 101 such that rotation of the knob causes connector 101 to translate as bearing 103 moves within recess 105 and channel 106 or such that rotation of the knob pushes or pulls the electrical connector in a direction transverse and substantially orthogonal to the lateral movement direction. Recess 105 may include one or more tracks on which bearing 103 slides, which tracks may assist in maintaining the alignment of bearing 103 and hence connector 101.

Figure 4:
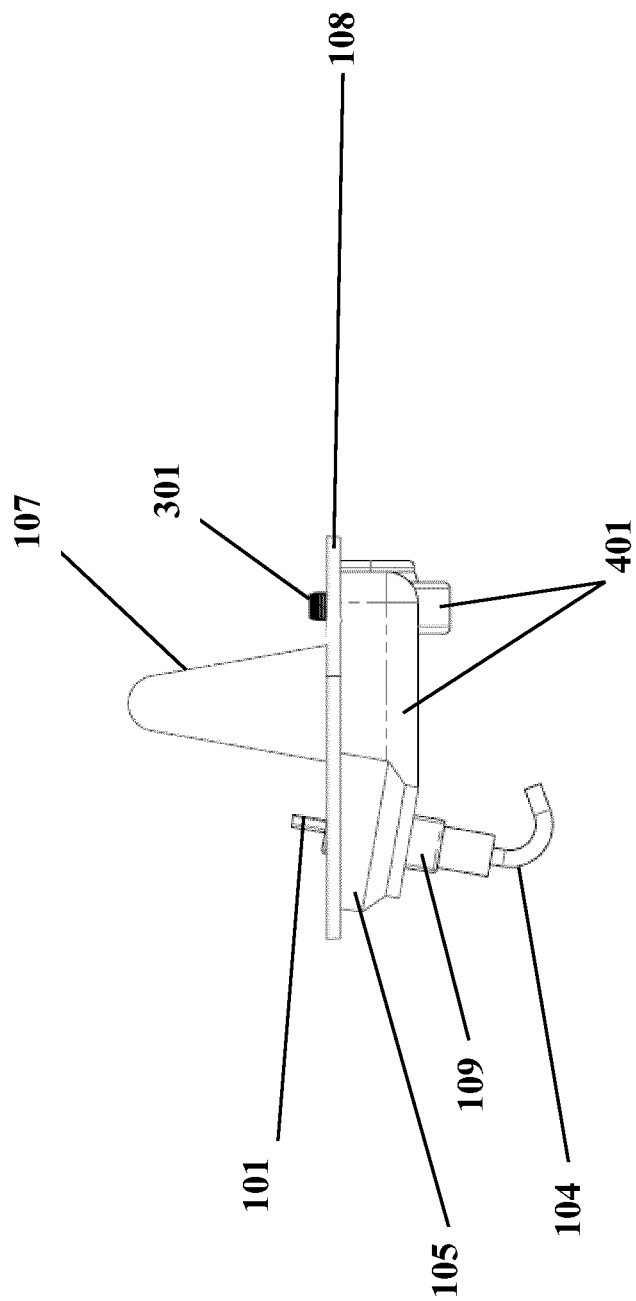
FIG. 4 is side view of the adjustable docking apparatus of FIG. 1.

FIG. 4 is side view of the adjustable docking apparatus of FIG. 1. As depicted in FIG. 4, recess 105, channel 106, connector 101 and the associated connector components shown in FIGS. 1-3 may be oriented at an angle in various embodiments, which angle may correspond to the an angle of a surface of support bracket 107. The angular orientation assists in facilitating the support of a device connected to connector 101 on support 107, and allows the device to be angled towards a user, which may be particularly suitable for environments where the base electrical system is located on a surface below the user's line of sight, such as a desk or table. FIG. 4 further demonstrates various shrouds 401 on the bottom of platform 108, which serve to isolate and contain various components of the positioner system which extend from the actuation mechanism of the positioner to the electrical connector 101. As further shown in FIG. 4 knob 301, may extend through the top of platform 108 in accordance with various inventive embodiments.

Figure 5:
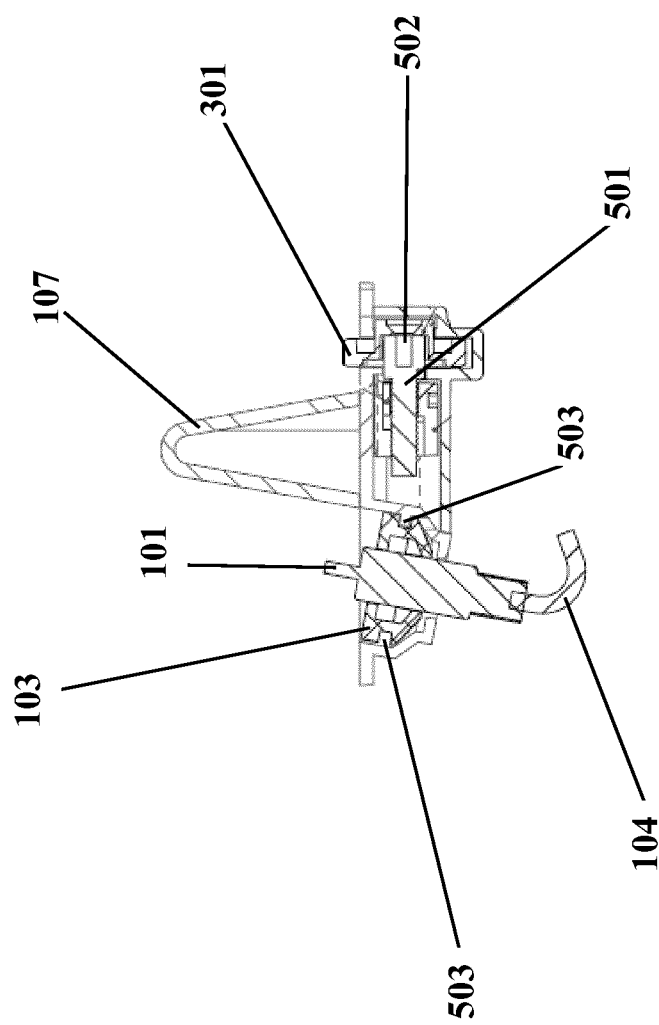
FIG. 5 is sectional side view of the adjustable docking apparatus of FIG. 1.

FIG. 5 is sectional side view of the adjustable docking apparatus of FIG. 1. FIG. 5 shows the components of a positioner system in accordance with inventive embodiments of that serve to connect the actuation mechanism, knob 301, to bearing 103 and hence connector 101. Knob 301 may be connected to bearing 301 via a screw thread 501 or a worm drive or any other mechanism or system of components for translating rotation of knob 301 into translation of bearing 103 within recess 105 in a direction that is at least one of transverse or parallel to the channel. An axle 502 may also be provided to maintain the position of knob 301 and/or drive 501 during their respective rotations. In accordance with embodiments using a slide mechanism, a simple rigid link may link the actuation mechanism to the electrical connector. FIG. 5 also demonstrates a series of tracks 503, to which bearing 103 may be engaged, for example, via grooves provided in a surface of the bearing. Such tracks help maintain the alignment of bearing 103 to assist in smooth consistent motion of the bearing and hence maintain the alignment of electrical connector 101.

Figure 6:
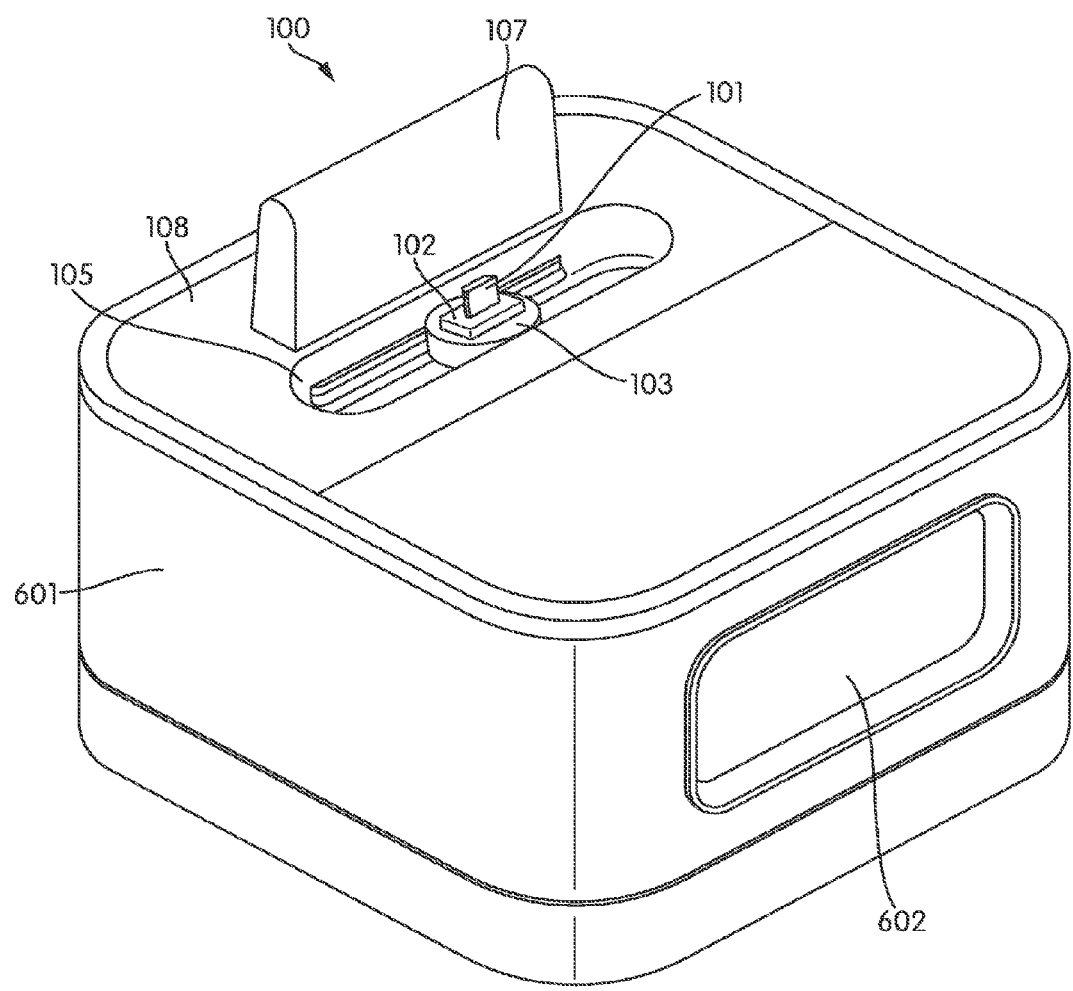
FIG. 6 is a perspective view of a base electronic device including an adjustable docking apparatus in accordance with various inventive embodiments.

FIG. 6 is a perspective view of a base electronic device including an adjustable docking apparatus in accordance with various inventive embodiments. As shown in FIG. 6 and adjustable docking apparatus, such as the system 100 shown in described in connection with, FIGS. 1-5, may be engaged with a base electronic system, such as system 601. The adjustable unit may be engaged with the base system by screws, by snap fit connections, or by other coupling mechanisms. In various embodiments the adjustable unit may be integral with the base electronic system. In the embodiment illustrated in FIG. 6, the base electronic system is an alarm clock radio. Other base electronic system, including but not limited to, a speaker system or an audio video display system may be provided in accordance with inventive embodiments. The alarm clock radio 601 includes a display device 602 for displaying information such as the time and data related to a device coupled to the electrical connector 101 of adjustable apparatus 100.

Figure 7:
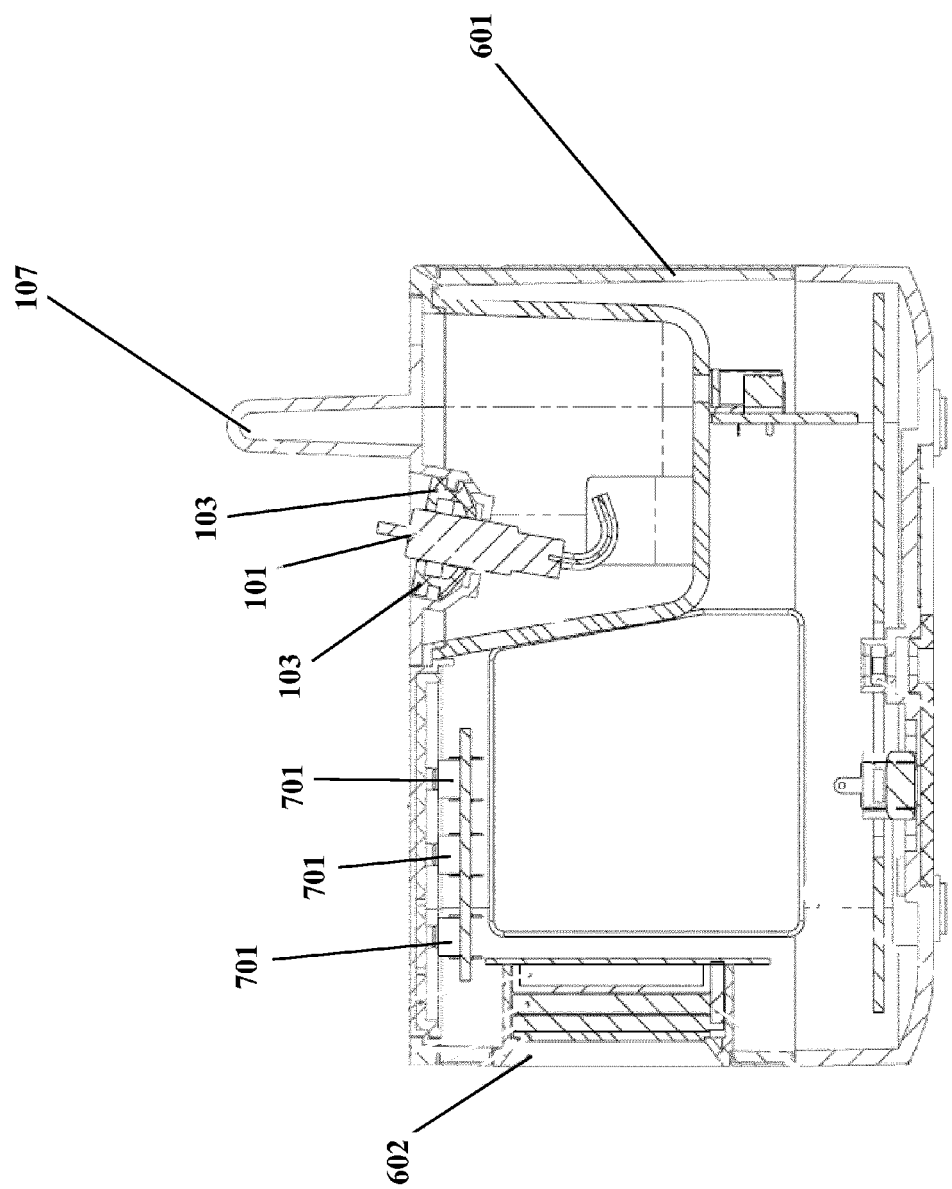
FIG. 7 is sectional side view of the base electronic device shown in FIG. 6.

FIG. 7 is sectional side view of the base electronic device shown in FIG. 6. FIG. 7 demonstrates how the adjustable docket apparatus couples to the alarm clock radio and further demonstrates some of the internal electrical components of the alarm clock radio. Flexible cable 104 of adjustable docking apparatus 100 provides an movable electrical pathway for data to travel from a device connected to connector 101 to the alarm clock radio via electrical interface 701. Interfaces 701 provide a variety of controls for the alarm clock radio and may be configured to allow the user to control a device connected to the alarm clock radio via connector 101. The base electronic device may also include a cable management system for accommodating and maintaining cable 104 in an organized fashion within the base device and to prevent the cable from being tangled with other components throughout the cables range of motion. The cable management system may include a post, a clip, a hook, or a bracket on or within which the cable may be wound.

Figure 8:
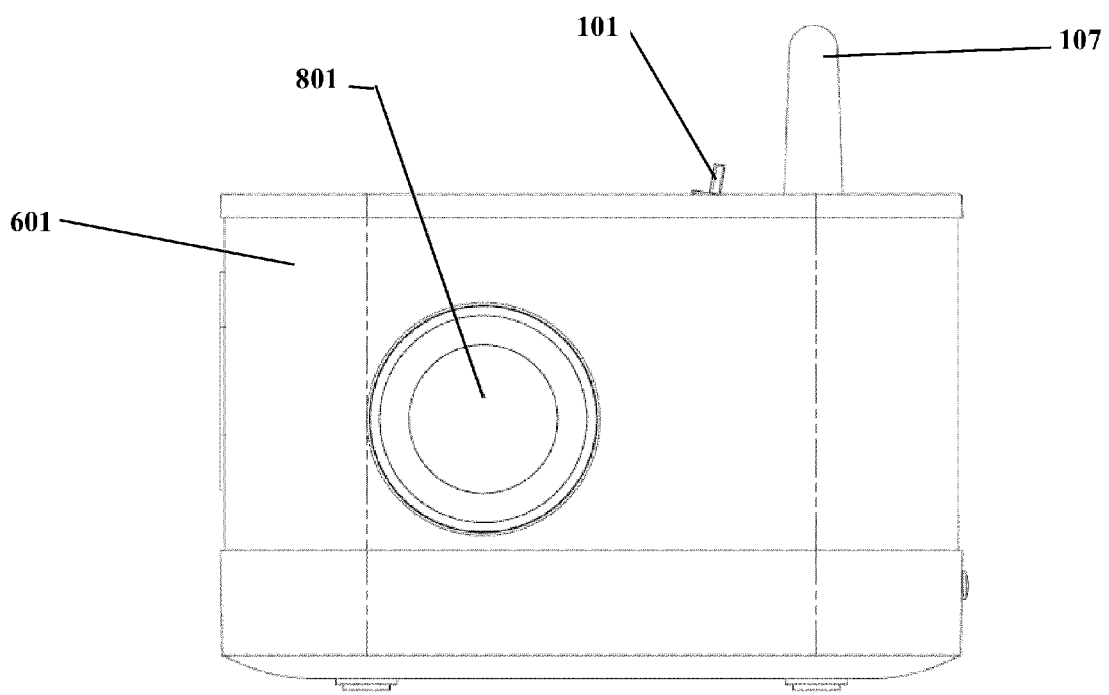
FIG. 8 is side view of the base electronic device of FIG. 6.
Figure 9A:
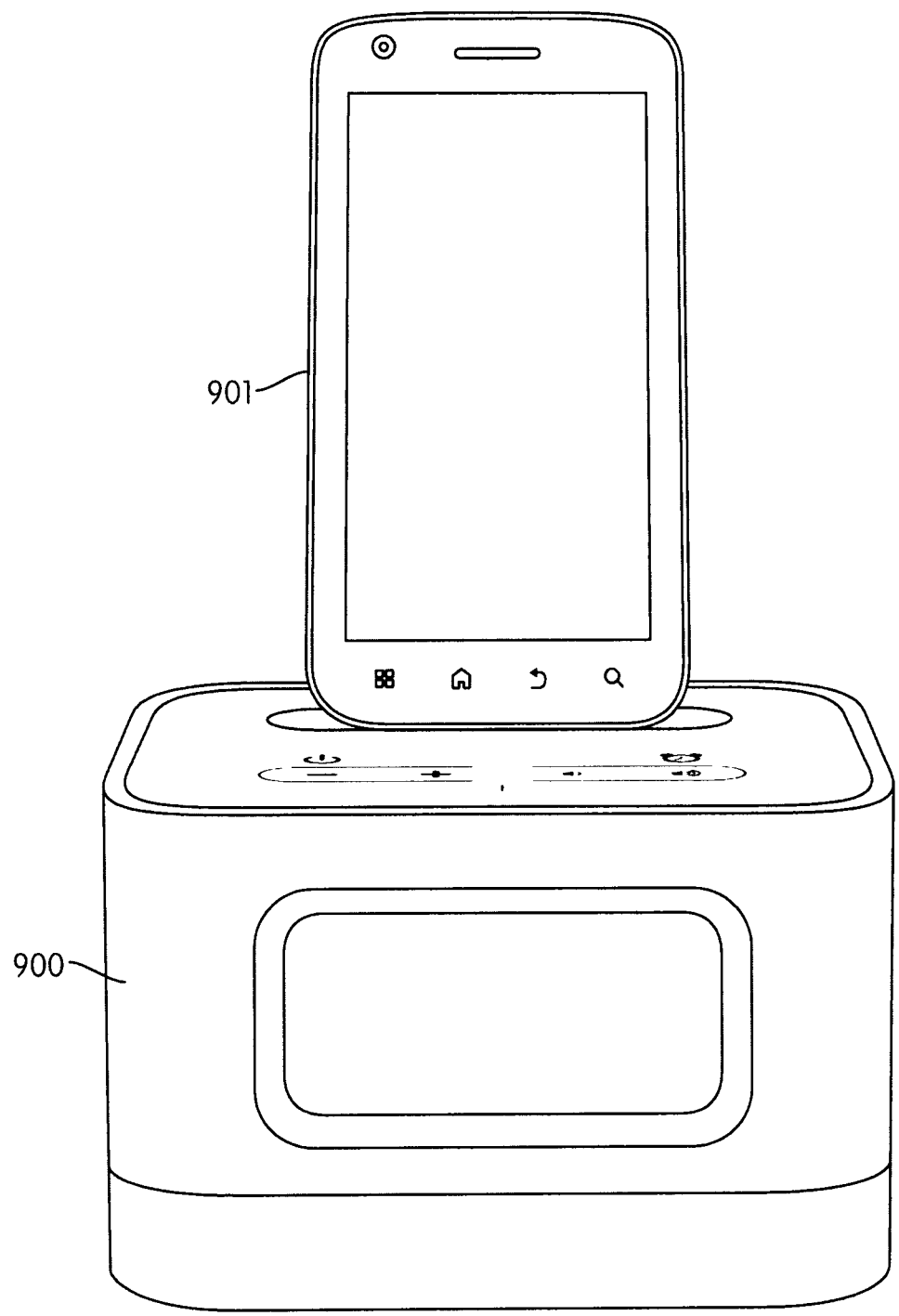
FIGS. 9A-9D illustrate various cellular phones coupled to a base electronic device having an adjustable docking apparatus in accordance with various inventive embodiments
Figure 9B:
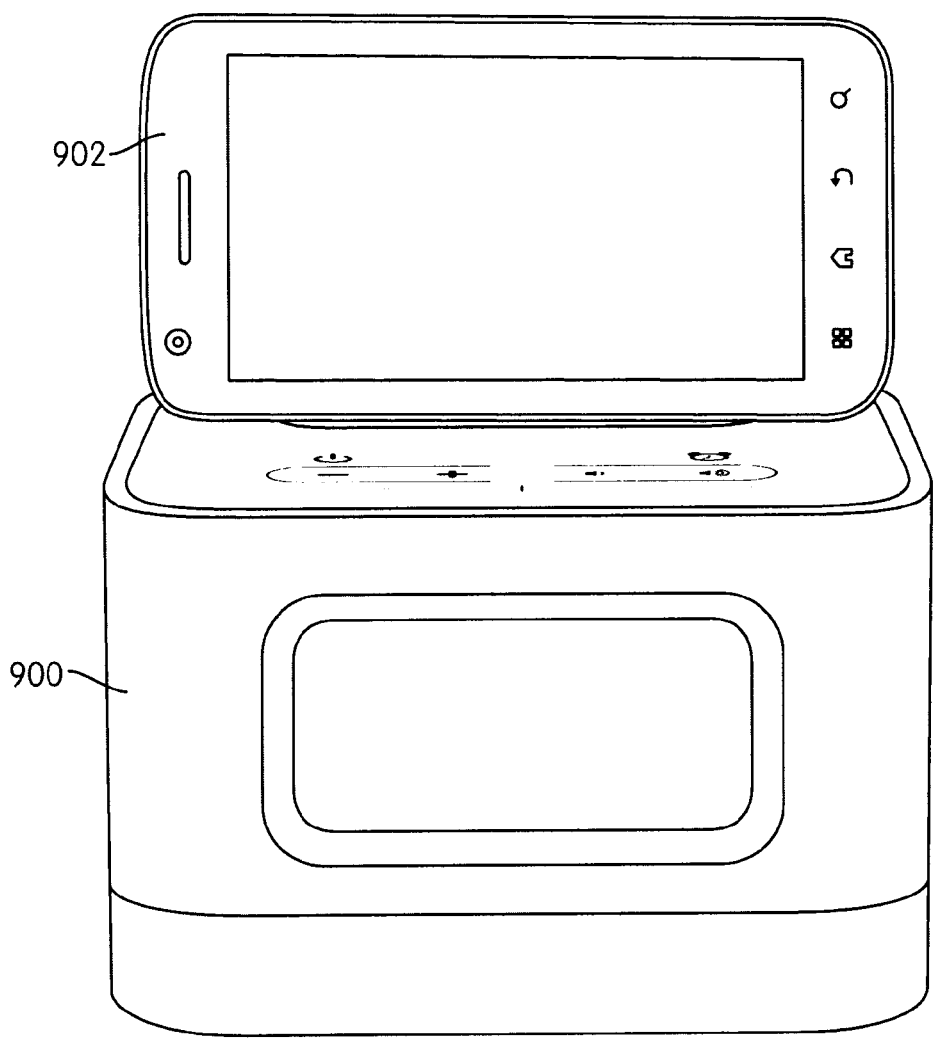
Figure 9C:
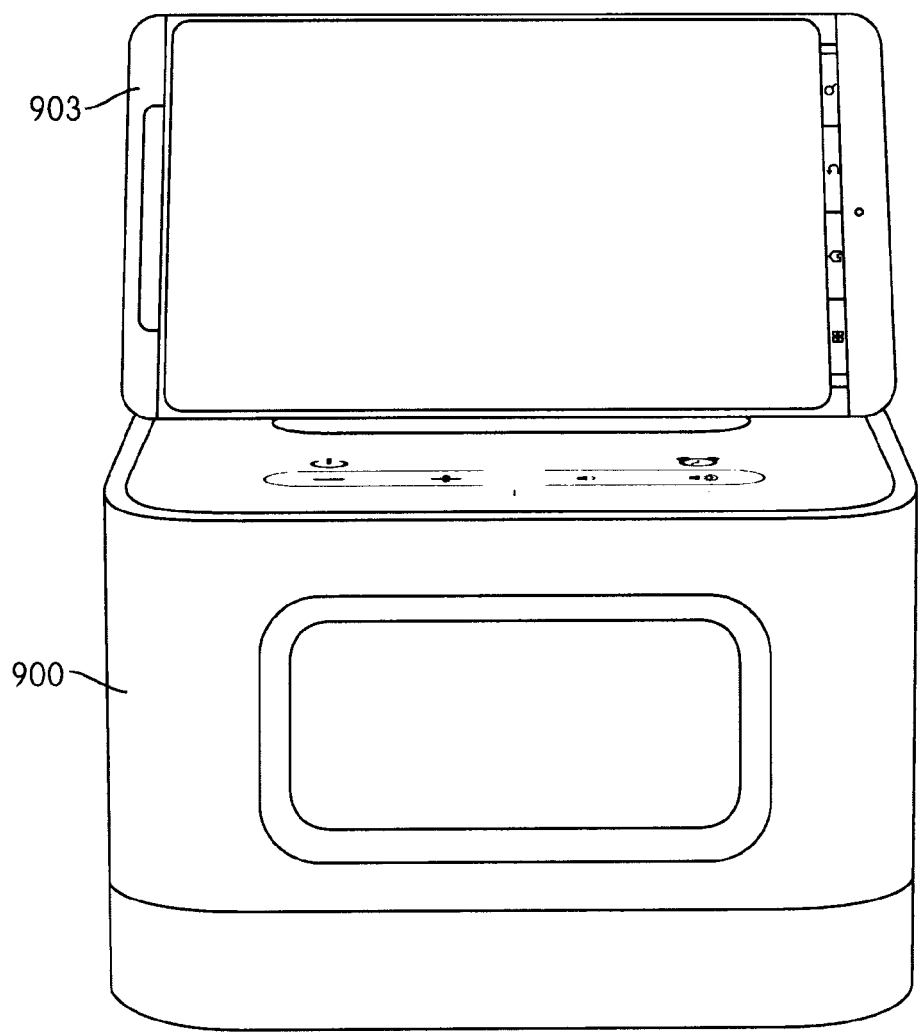
Figure 9D:
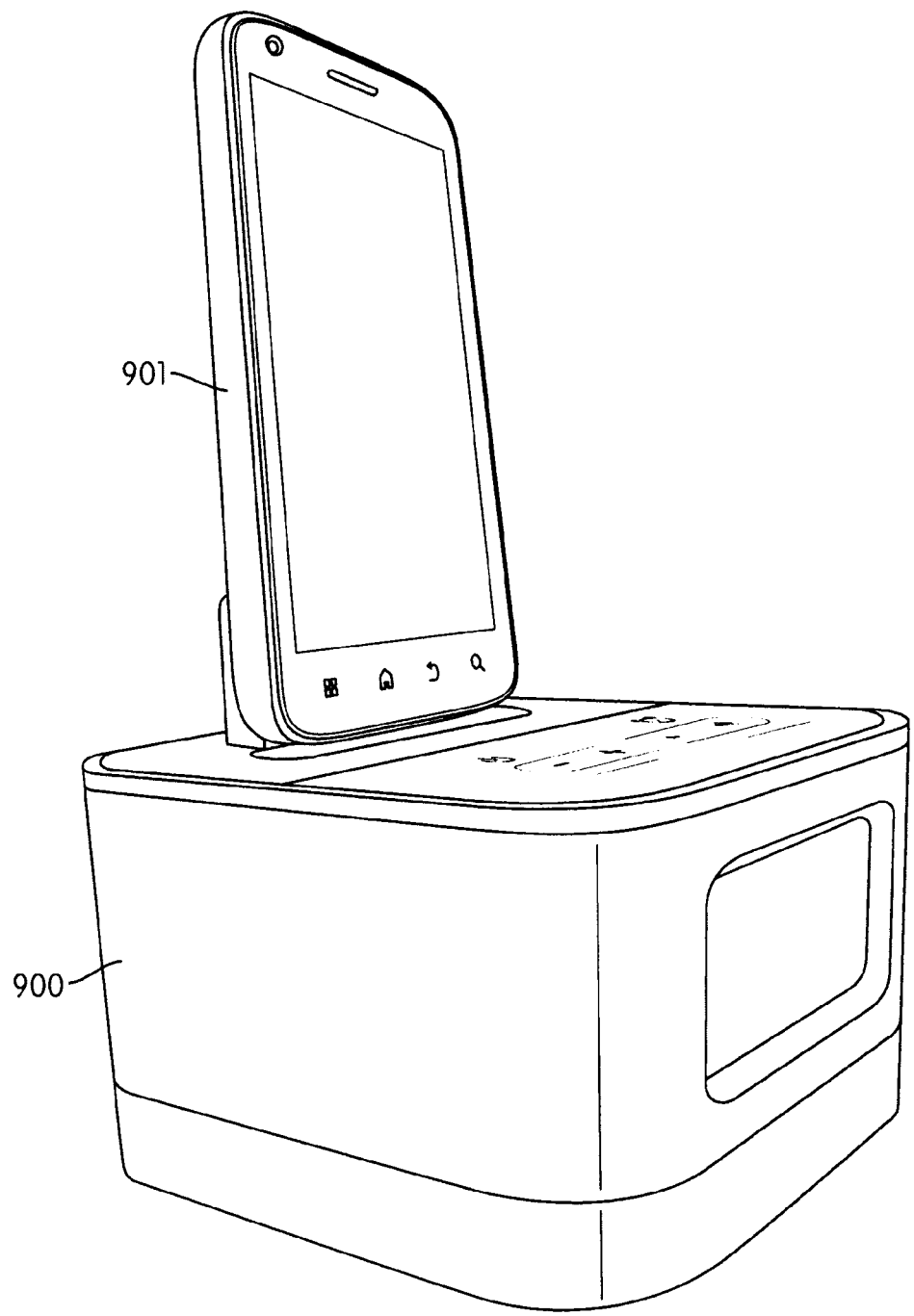

FIG. 8 is side view of the base electronic device of FIG. 6. FIG. 8 further illustrates a speaker system 801 which may be provided with the alarm clock radio 601, to transmit sound emanating from a connected device to a user.

FIGS. 9A-9D illustrate various cellular phones coupled to a base electronic device having an adjustable docking apparatus in accordance with various inventive embodiments. Collectively, FIGS. 9A-9D demonstrate how the adjustable docking apparatus in accordance with various inventive embodiments allows devices having a variety of port locations to be properly positioned, centered, and supported on a base electronic device such as an alarm clock radio. For example, the electronic device 901 in FIGS. 9A and 9D having an input output port on the bottom may be centrally docked and stabilized on the alarm clock radio 900 device just as devices 902 and 903 in FIGS. 9B and 9C respectively. Furthermore, even if device 902 has a port located near the top side edge and device 903 has a port located near the bottom side edge each of the device can be centrally docked and stabilized on the same alarm clock radio 900 vis-à-vis movement of the adjustable electrical connector without the need of a separate adapter, cradle, docking unit, or entire device. Accordingly, a variety of devices is compatible with the same base device.

Figure 10A:
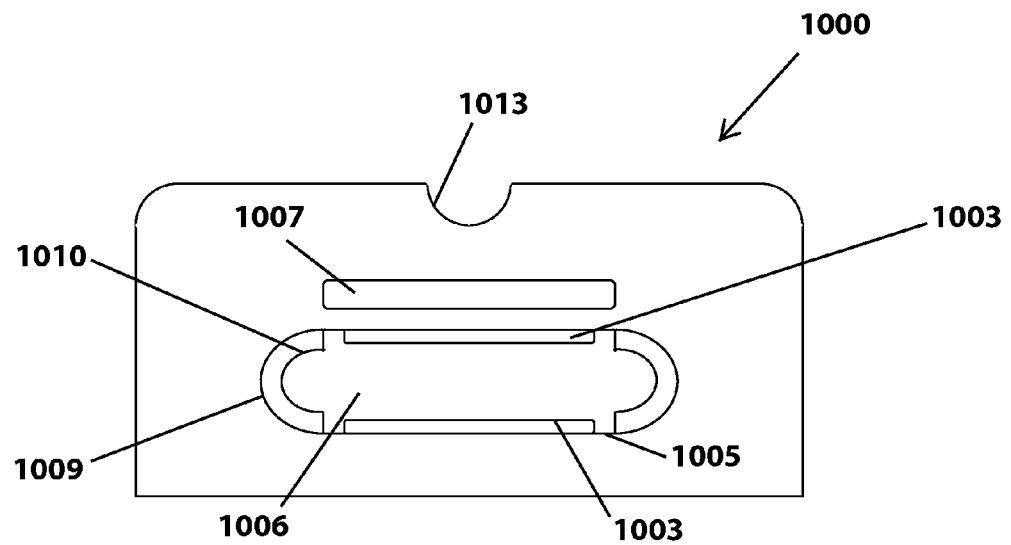
FIGS. 10A and 10B depict a schematic of an adjustable docking unit in accordance with various inventive embodiments.
Figure 10B:
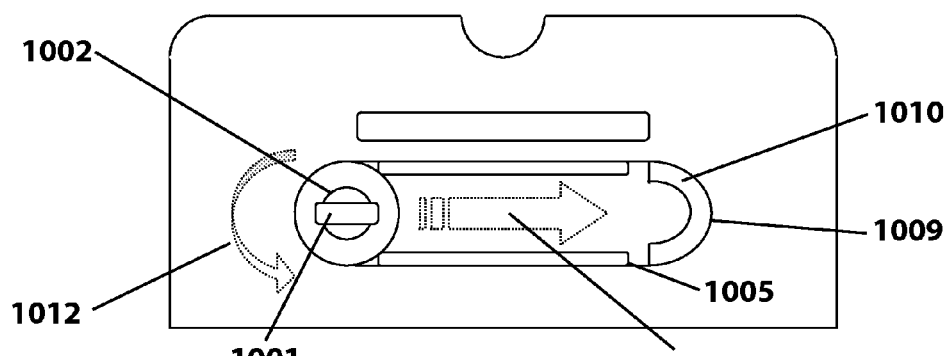
Figure 11A:
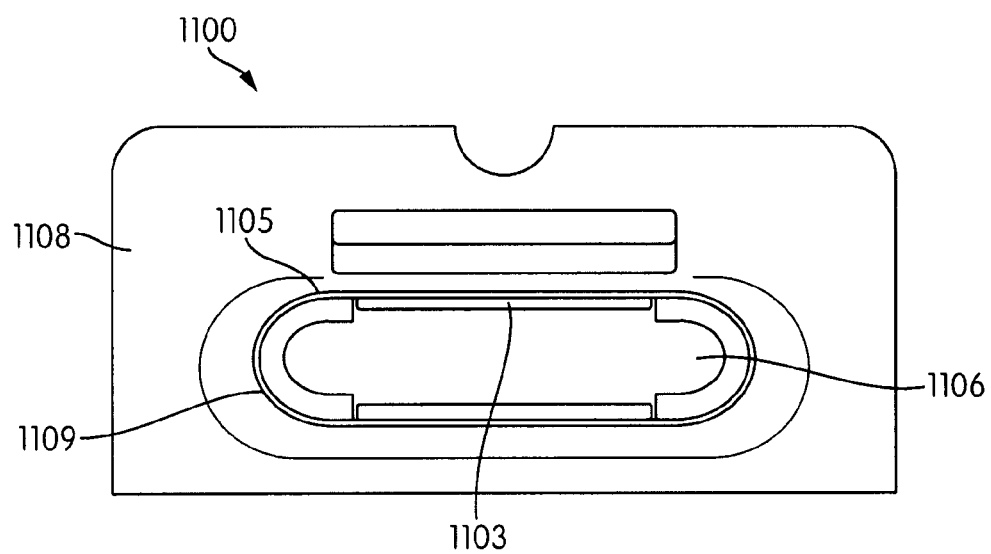
FIGS. 11A and 11B show an example of another adjustable docking unit in accordance various inventive embodiments.
Figure 11B:
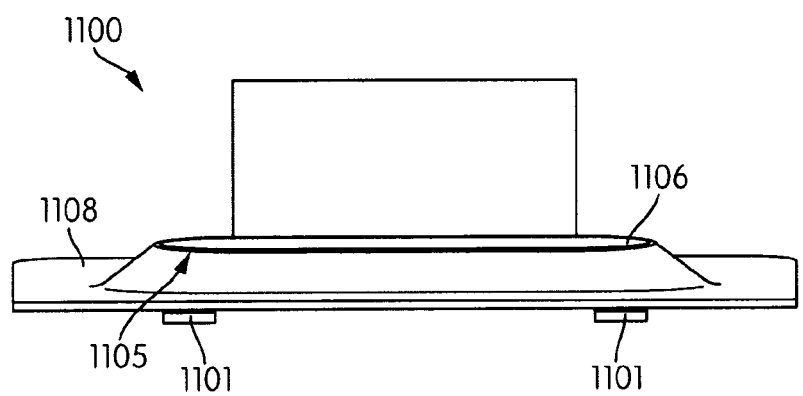

FIGS. 10A and 10B depict a schematic of an adjustable docking unit in accordance with various inventive embodiments. In the schematic shown in FIG. 10A, adjustable docking unit 1000 is depicted without a connector. Adjustable docking unit 1000 includes a platform 1008 having a cradle region 1005 including an aperture 1006 extending there through. As shown in later figures, aperture 1006 permits access to and modulation of one or more cables connected to a base electronic device, such as a clock radio, so that the cables may be connected to an electronic device positioned on the adjustable docking unit. Cradle region 1005 includes a portion 1009 disposed at extremities of the cradle region, which portions are geometrically shaped to allow a connector, such as connector 1001 shown in FIG. 10B, to be removably coupled to docking unit 1000 in particular orientations. More specifically, region 1009 includes a shape that corresponds to platform 1002 of connector 1001. Additionally, cradle 1005 includes tracks 1003 upon which connector 1001 slides (as demonstrated by arrow 1011). Tracks 1003 extend along a front and rear portion of cradle 1005, but do extend the entire length of the cradle. More specifically, tracks 1003 terminate before the curved region 1009 such that connector 1001 may be positioned into the cradle (through motion in a direction into and out of the page or into and out of the plane of platform 1008). Curved region 1009 may also include a flange or taper 1010 that prevents connector 1001 from dropping below a certain height in cradle 1005 and facilitates aligning connector 1001 for engagement with tracks 1003. As demonstrated further herein, in some embodiments connector 1001 may include channels disposed within base platform 1002 of the connector, which channels are configured for engagement with tracks 1003. As demonstrated by arrow 1012, curved region 1009 allows connector 1001 to be rotated within cradle 1005 for proper alignment of channels disposed in the platform 1002 of connector 1001 with tracks 1003 of cradle 1005. FIGS. 10A and 10B further demonstrate that adjustable docking unit 1000 may also include a support bracket 1007. Additionally, adjustable docking unit 1000 may include a recess 1013 that facilitates grasping the docking unit for removal from a base device to which dock 1000 is engaged. Adjustable docking unit 1000 may alternatively include a fixed or flexible release tab for facilitating removal of unit 1000 from an underlying base device FIGS. 11A and 11B show an example of another adjustable docking unit in accordance various inventive embodiments. FIG. 11A is a top view of an adjustable docking unit 1100, and FIG. 11B is a front view of adjustable docking unit 1100. As depicted in the example demonstrated in FIGS. 11A and 11B, cradle region 1105 of an adjustable docking apparatus may include a raised surface with respect to the plane of platform 1108. Embodiment 1100, in a manner similar to embodiment 1000 of FIGS. 10A and 10B, includes tracks 1003 for slidably engaging an electrical connector, a curved insertion region 1109, and an aperture 1106 extending through platform 1108 in cradle region 1105. As further shown in FIG. 11B, unit 1100 may include engagement tabs 1101 configured to engage a surface of an underlying base electronic device to facilitate removably coupling the adjustable docking unit with the base device.

Figure 12:
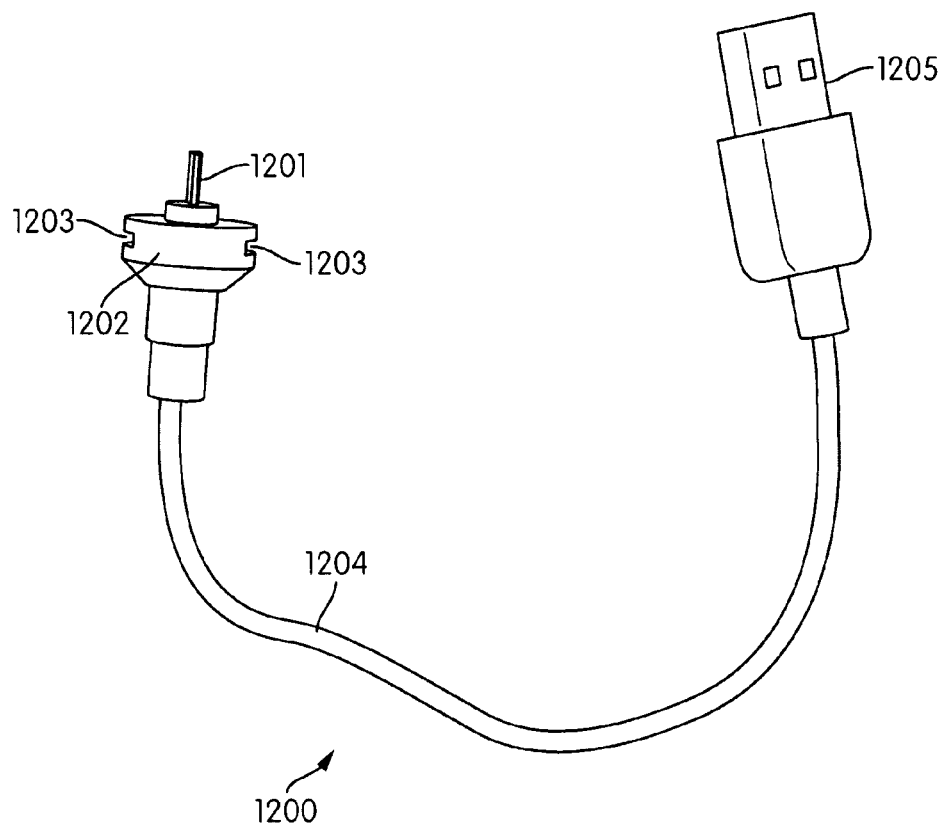
FIG. 12 illustrates a connector useable with an adjustable docking unit in accordance with various inventive embodiments.

FIG. 12 illustrates a connector useable with an adjustable docking unit in accordance with various inventive embodiments. In some embodiments, the connector may be a single unit, such as unit 1200, that includes a first connector portion 1201 configured to be positioned within the cradle region of an adjustable docking unit, a flexible cable 1204, and a second connector 1205 for removably connecting to a port in a base electronic device. FIG. 12 illustrates that connector 1201 may include a base portion 1202 with one or more channels 1203 positioned therein. The channels are shaped to correspond to the tracks of an adjustable docking unit so that connector portion 1201 slides with respect to the docking unit. Each of connectors 1201 and 1205 may include one of a variety of electrical connector types, such as the connectors disclosed herein. As shown in FIG. 12, connector portion 1205 may include a USB type connector and connector portion 1201 may include a micro-USB type connector. The removability of connector 1200 from the adjustable docking unit provides inventive embodiments with additional modularity. This modularity allows a variety of mobile devices to be used with an adjustable docking unit and base electronic device even if the devices use distinct port types. If a user changes devices or has more than one device with distinct charging ports, the user may simply interchange connector 1200 (or at least a portion of the connector 1201) to correspond with the appropriate device.

Figure 13:
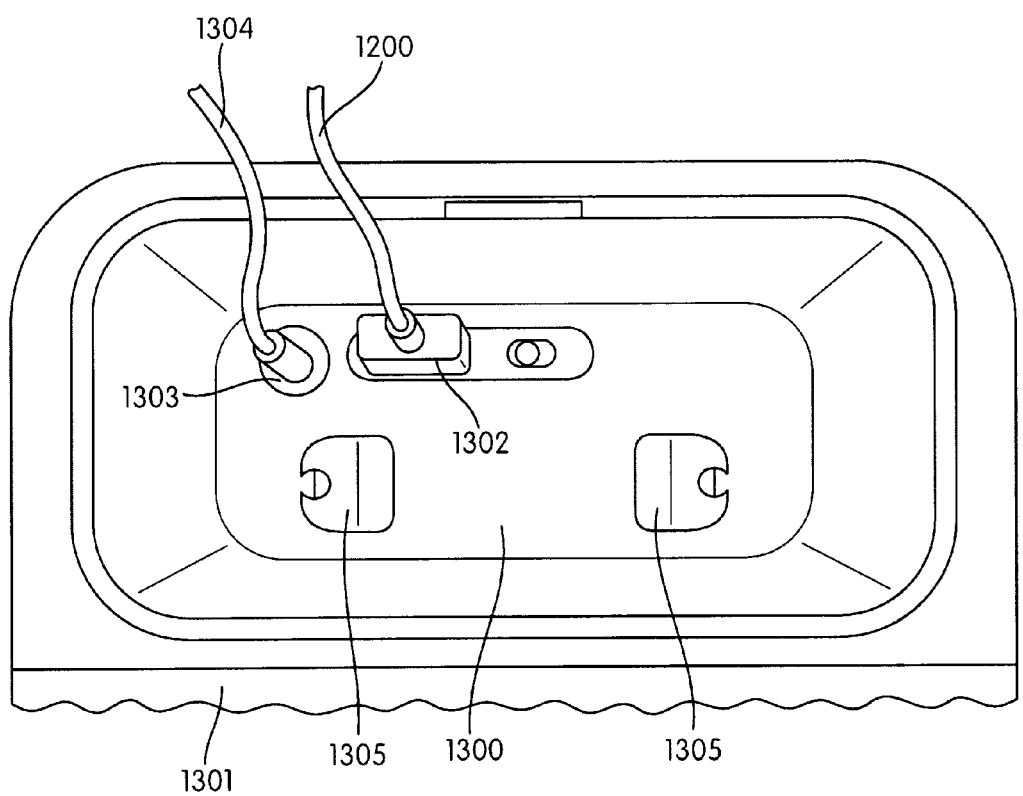
FIG. 13 illustrates a cable management region disposed within a base electronic device with which an adjustable docking unit may be docked in accordance with various inventive embodiments.

FIG. 13 illustrates a cable management region disposed within a base electronic device with which an adjustable docking unit may be docked in accordance with various inventive embodiments. Cable management region 1300 provides a space for maintaining one or more cables connecting a mobile device to base electronic device 1301. FIG. 13 demonstrates that the cable management region may include a plurality of ports such as an USB port 1302, which may permit charging via cable 1200, and such as an auxiliary port 1303 which may permit music played on the mobile device to be played through audio components of an underlying base system, via cable 1304. The cable management region may include other features such as tabs 1305. FIG. 13 further shows tabs 1305, which may be curved and/or include notches to facilitate holding any cables in a particular position or orientation.

Figure 14:
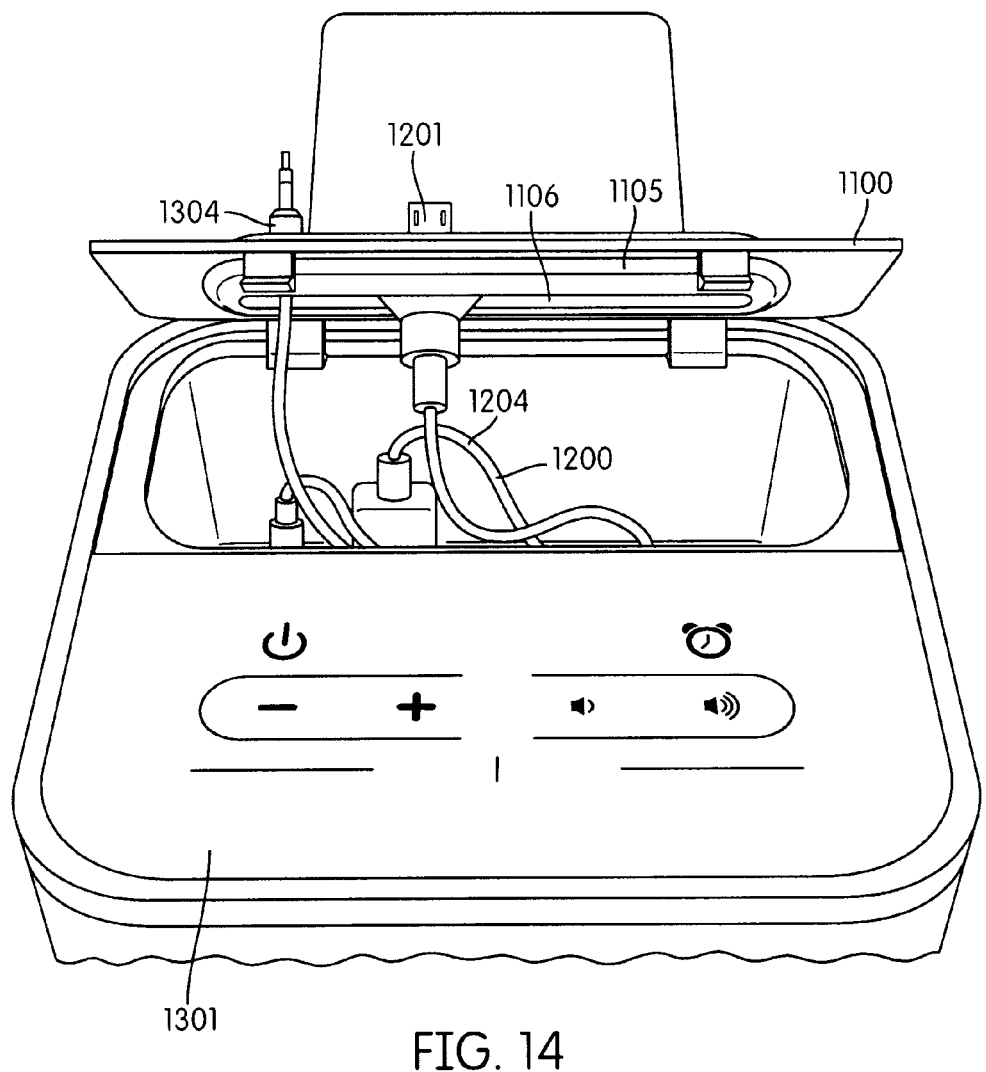
FIG. 14 illustrates the adjustable docking unit of FIGS. 11A and 11B positioned on a base electronic device and coupled with multiple connectors in accordance with various inventive embodiments.

FIG. 14 illustrates the adjustable docking unit of FIGS. 11A and 11B positioned on a base electronic device and coupled with multiple connectors in accordance with various inventive embodiments. More specifically FIG. 14 depicts the adjustable docking unit 1100 of FIGS. 11A and 11B positioned above the cable management region 1300 of base device 1301, shown in FIG. 13 (in the illustrated example an alarm clock radio). As demonstrated, the cable connected to base device 1301 extends through aperture 1106 in cradle 1105 to connect with a mobile device positioned on adjustable docking unit 1100. FIG. 14 shows that in addition to permitting access to connector 1201, aperture 1106 permits access to cable 1304.

Figure 15A:
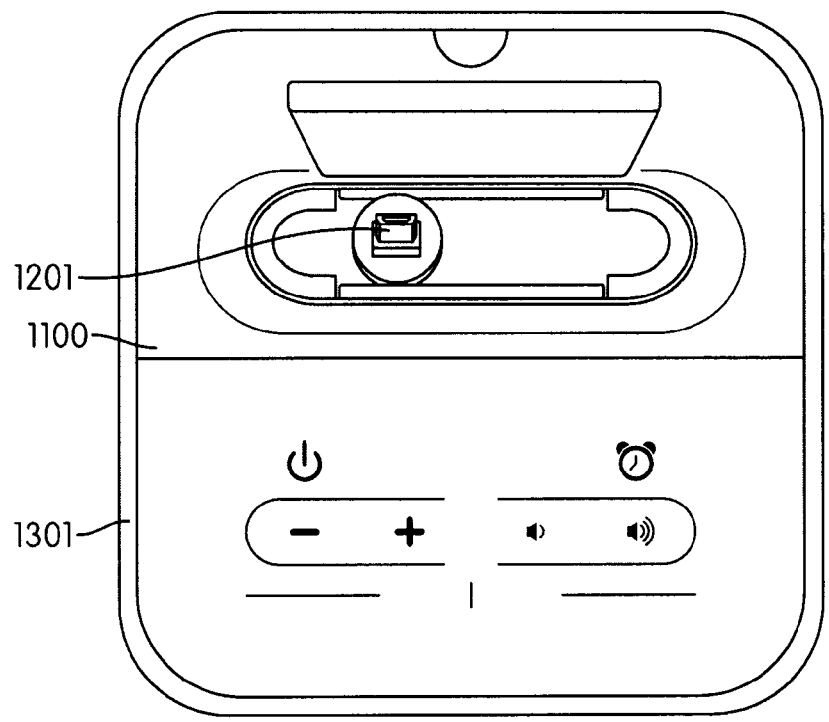
FIGS. 15A and 15B illustrate the adjustable docking unit of FIGS. A and 11B coupled to a base electronic device with a connector disposed in various orientations in accordance with various inventive embodiments. The skilled artisan will understand that the figures are for illustration purposes only. It is to be understood that in some instances various aspects of the inventive embodiments may be shown illustrated or enlarged to facilitate an understanding of the embodiments. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.
Figure 15B:
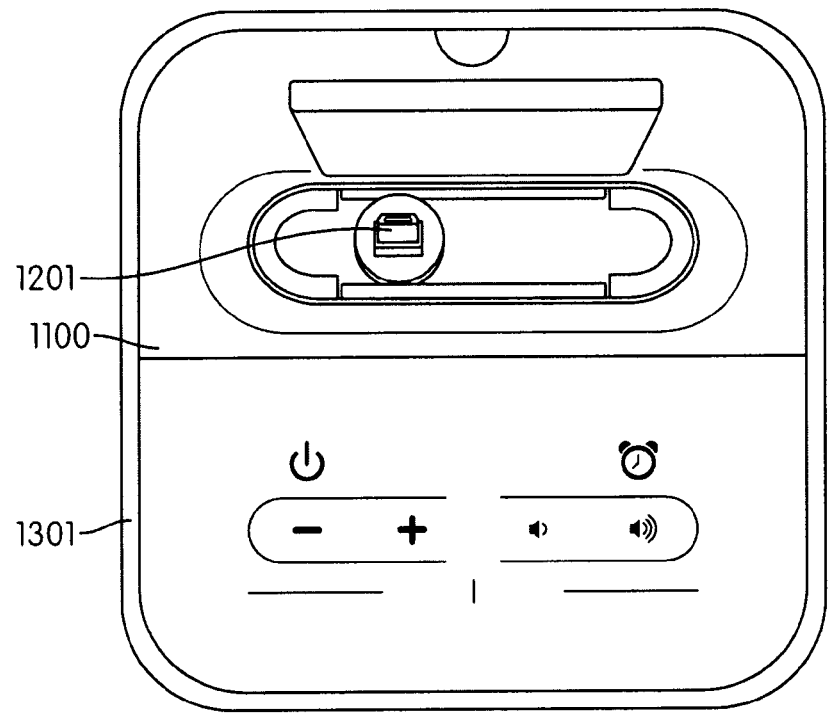

FIGS. 15A and 15B illustrate the adjustable docking unit of FIGS. A and 11B coupled to a base electronic device with a connector disposed in various orientations in accordance with various inventive embodiments. Specifically, adjustable docking unit 1100 is illustrated coupled to alarm clock radio 1301. As shown by comparing and contrasting the orientation of connector 1201 in FIG. 15A with the orientation of connector 1201 in FIG. 15B the ability to removably couple cable 1200 and connector 1201 of cable 1200 with adjustable docking unit 1100 allows connector 1201 to be positioned in alternative positions such that distinct mobile devices connected to connector 1201 and positioned on the adjustable docking apparatus may face in the desired user orientation even with a directional connector and mobile device with distinct port orientations. Connector 1201 in FIG. 15A is rotated 180 degrees with respect to connector 1201 in FIG. 15B. Accordingly, if one mobile device has a directional connector port that, for example, gets narrower from the front of the device (screen side) to the back of the device and another device has a direction connector port that gets narrower from the back of the device to the front of the device (screen) side each device can be connected to connector 1201 and positioned on device 1301 with the screen facing the same direction by changing the orientation of connector 1201 with respect to adjustable docking unit 1100 and device 1301.

The above described inventive embodiments provide solely exemplary embodiments. Those of ordinary skill in the art will appreciate that the present invention includes variation and modifications of the disclosed embodiments, which variation are within the scope of the present invention and may be captured by an claims provided herein or added hereto.

The invention claimed is:

1. An apparatus for adjustably docking a mobile electronic device on a base electronic device, the apparatus comprising:
   a docking platform for receiving a mobile electronic device, the docking platform positioned in an upper region of the base electronic device, the docking platform having an opening in a surface of the docking platform, the docking platform removably coupled to the base electronic device; and
   an electrical connector electrically coupled to the base electronic device, the electrical connector removably and slidably coupled to the docking platform, at least a portion of the electrical connector extending through the opening in the surface of the docking platform and electrically connectable to the mobile electronic device,
   wherein the electrical connector extends through the opening in the docking platform such that a base of the connector and a peripheral side of a mobile electronic device connected to the electrical connector interface in a plane of the docking platform, whereby the connected mobile electronic device is flush with the docking platform; and
   wherein the electrical connector is configured for at least 180 degrees of rotation in the docking platform.

2. The apparatus of claim 1, wherein the docking platform includes a recess disposed therein and wherein the opening is positioned in the recess.

3. The apparatus of claim 2, wherein the electrical connector includes a channel and the docking platform includes a track configured for engagement with the channel whereby the electrical connector is removably and slidably coupled to the docking platform.

4. The apparatus of claim 3, wherein the electrical connector includes a second electrical connector electrical coupled to the first electrical connector via a flexible cable.

5. The apparatus of claim 4, wherein the base electronic device includes a connector port configured for removably coupling the second electrical connector to the base electronic device.

6. The apparatus of claim 1, further comprising a posterior support bracket coupled to the docking platform to provide support to the mobile electronic device when received on the docking platform, the posterior support bracket extending from the base electronic device in a direction having a vertical component.

7. The apparatus of claim 1, wherein the electrical connector is electrically connected to the base electronic device by a flexible electrical cable.

8. The apparatus of claim 7, wherein the flexible electrical cable is removably connected to the base electronic device.

9. The apparatus of claim 1, wherein the electrical connector is angled with respect to the docking platform.

10. The apparatus of claim 9, wherein the electrical connector angle corresponds with an angle of a surface of the posterior support bracket, such that the electrical connector and the angled surface of the posterior support bracket are substantially parallel.

11. The apparatus of claim 1, wherein the electrical connector includes at least one of a portable digital media interface connector, a Type A USB connector, a Type B USB connector, and a micro-USB connector.

12. The apparatus of claim 1, wherein the base electronic device is at least one of a speaker system, a clock radio, a telephone, a keyboard, and an electronic display.

13. A system for docking a mobile electronic device, the system comprising:
- a base electronic device, the base electronic device having at least one of an audio output component or a video output component for providing output from a mobile electronic device docked on the base electronic device;
- a docking platform for receiving the mobile electronic device, the docking platform removably coupled to the base electronic device and positioned in an upper region of the base electronic device, the docking platform including an opening;
- an electrical connector electrically coupled to the base electronic device, the electrical connector removably and slidably coupled to the docking platform, at least a portion of the electrical connector extending through the opening in the docking platform and electrically connectable to the mobile electronic device,
- wherein the electrical connector is configured for at least 180 degrees of rotation in the docking platform.

14. The system of claim 13 further comprising a posterior support bracket coupled to the base electronic device to provide support to the mobile electronic device when received on the docking platform, the posterior support bracket extending from the base electronic device in a direction having a vertical component.

15. The system of claim 13 wherein the electrical connector includes a channel and the docking platform includes a track configured for engagement with the channel whereby the electrical connector is removably and slidably and coupled to the docking platform.

16. The system of claim 13, wherein the electrical connector includes a second electrical connector electrically coupled to the first electrical connector via a flexible cable.

17. The system of claim 16, wherein the base electronic device includes a connector port configured for removably coupling the second electrical connector to the base electronic device.

18. The system of claim 16, wherein the second electrical connector is a USB connector.

* * * * *